United States Patent
Pruitt et al.

(10) Patent No.: US 10,287,845 B1
(45) Date of Patent: May 14, 2019

(54) SWIVEL DEVICE FOR ROTATING A BOWL

(71) Applicants: Grant Pruitt, Fort Smith, AR (US); Cris Braun, Van Buren, AR (US)

(72) Inventors: Grant Pruitt, Fort Smith, AR (US); Cris Braun, Van Buren, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 54 days.

(21) Appl. No.: 15/464,021

(22) Filed: Mar. 20, 2017

(51) Int. Cl.
*E21B 33/08* (2006.01)

(52) U.S. Cl.
CPC .................................. *E21B 33/085* (2013.01)

(58) Field of Classification Search
CPC ............................ E21B 33/085; E21B 33/0415
See application file for complete search history.

(56) References Cited

U.S. PATENT DOCUMENTS 6,354,385 B1 * 3/2002 Ford .......................... E21B 3/04
166/84.3

\* cited by examiner

*Primary Examiner* — David J Bagnell
*Assistant Examiner* — Kristyn A Hall
(74) *Attorney, Agent, or Firm* — Schrantz Law Firm, PLLC; Stephen D. Schrantz

(57) ABSTRACT

The swivel device attaches to a bowl or is implemented as a component of the bowl. The swivel device enables adjustment of the bowl to align the outlet with the flowline. A flange of the swivel device includes multiple fastener apertures for securing the flange to the stack. The swivel device secures the bowl to the stack while allowing rotation of the bowl. Rotation of the bowl adjusts the positioning of the outlet to align the outlet with the flowline for connecting the outlet to the flowline.

8 Claims, 10 Drawing Sheets

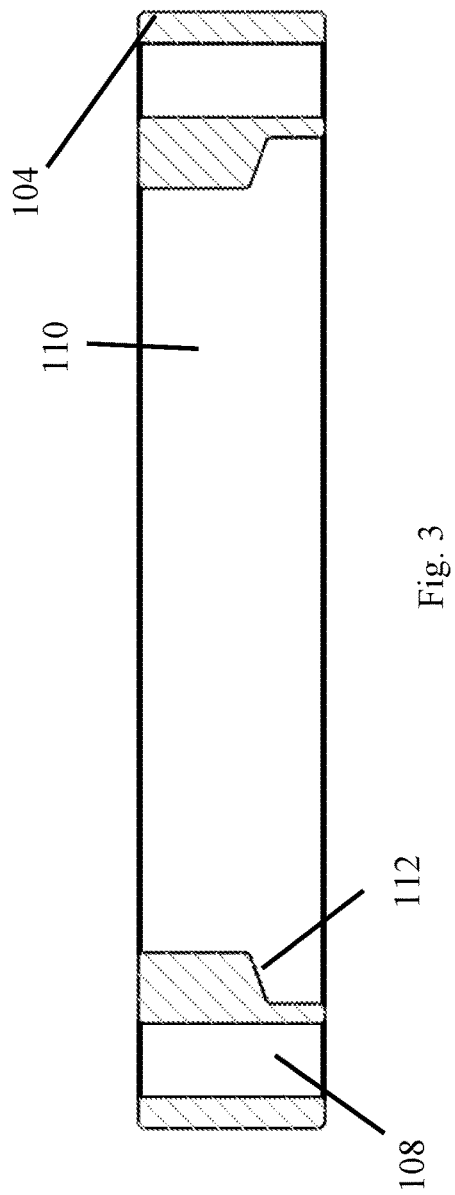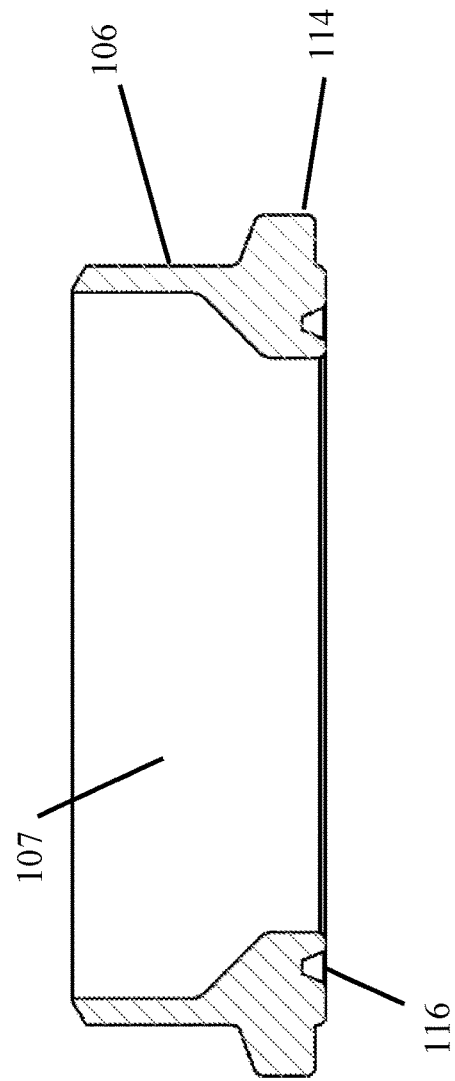
Fig. 3
Fig. 4

SWIVEL DEVICE FOR ROTATING A BOWL

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to securing drilling equipment while allowing for rotation and swiveling of the equipment for proper installation at the rig. In particular, the present invention relates to a swivel device that attaches to the bowl or is a component of the bowl that allows repositioning of the outlet to meet the flowline.

In the oil and gas industry, rig personnel often install a bowl as a component for operating rotating control device (RCD). The bowl seals pipe inserted into the wellbore while allowing rotation. The bowl also contains and diverts fluids such as drilling mud, produced fluids, and surface injected air or gas to a flowline.

The bowl provides an outlet for directing the fluids to the flowline. The flowline secures to the outlet. However, the bowl secures to the stack in a fixed position. Installing the bowl in the fixed position may occasionally lead to the outlet not aligning with the flowline. In such instances, the bowl must be uninstalled. Installation of the bowl must then be modified to align the outlet with the flowline.

Removing and modifying the installation of the bowl decreases operation time and increases operating costs. The operation of the rig must be halted while the bowl is properly installed. Such downtime costs money and causes rig non-productive time (NPT).

By reducing the downtime and NPT, the present invention increases operation while reducing time spent cleaning. The present invention also provides a more convenient system that reduces the equipment needed and increases functionality of existing drilling equipment.

II. Description of the Known Art

Patents and patent applications disclosing relevant information are disclosed below. These patents and patent applications are hereby expressly incorporated by reference in their entirety.

U.S. Pat. No. 7,308,954 issued to Martin-Marshall on Dec. 18, 2007 ("the '954 patent") teaches a rotating diverter head for use on a blow out preventer stack of an oil, gas or geothermal well. While providing for sealing and rotation of a drill pipe through the head, the head taught by the '954 patent additional includes a flange on which the head is rotatable. The flange taught by the '954 patent connects the head to the stack whereupon it can be rotated to align a return flow line before being locked in position.

These shortcomings are overcome by the invention disclosed herein. Accordingly, it would be desirable to provide an improved device and system for securing the outlet of the bowl to the flowline.

SUMMARY OF THE INVENTION

The swivel device of the present invention attaches to a bowl or is implemented as a component of the bowl. The swivel device enables adjustment of the bowl to align the outlet with the flowline. A flange of the swivel device includes multiple fastener apertures for securing the flange to the stack.

The swivel device provides a flange, such as a shoulder that secures a neck within the shoulder. The neck rotates within the shoulder to allow for repositioning of the outlet of the bowl. In one embodiment, the swivel device provides a lower shoulder that allows rotation of the neck. An upper flange secured to the neck remains fixed to the neck such that the upper flange rotates with the neck. The bowl attaches to the upper flange located vertically above the shoulder. Such an embodiment with the upper flange raises the bowl off the annular.

In another embodiment, the neck is directly secured to the bowl. The shoulder attaches to the annular. The shoulder secures the bowl while allowing the bowl to rotate.

Rotation of the bowl adjusts the positioning of the outlet. Adjustment of the outlet enables alignment of the outlet with the flowline. The flowline is placed in a fixed position such that adjusting the position and orientation of the flowline is difficult.

The present invention reduces the downtime and costs of operating the drilling rig. The present invention increases the functionality of existing equipment. The present invention also reduces the time required to install equipment. The present invention also provides a safer work environment and reduces the time required to secure the outlet of the bowl to the flowline.

It is an object of the present invention to swivel the outlet of the bowl to align with the flowline.

Another object of the present invention is to raise the bowl off of the annular.

Another object of the present invention is to reduce the time required to install the bowl.

Another object of the present invention is to reduce the time required to connect the flowline to the outlet of the bowl.

Another object of the present invention is to allow for the trouble free connection of the flowline to the outlet of the bowl.

Another object of the present invention is to create a safer work environment for rig personnel.

Another object of the present invention is to avoid unnecessary removal of the bowl to align the bowl with the flowline.

Another object of the present invention is to simplify the method of connecting the outlet to the flowline.

In addition to the features and advantages of the swivel device for rotating a bowl according to the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a partial sectional view thereof;

FIG. 4 is a partial sectional view thereof;

DETAILED DESCRIPTION

Figure 1:
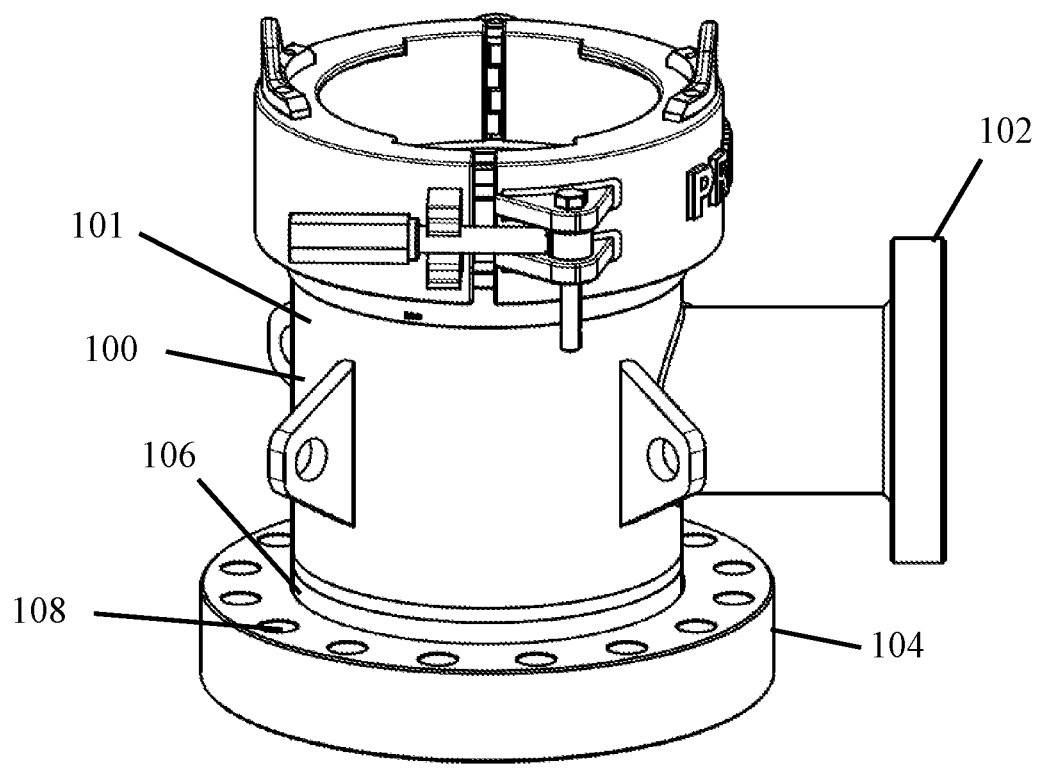
FIG. 1 is an environmental view showing one embodiment of the present invention.
Figure 8:
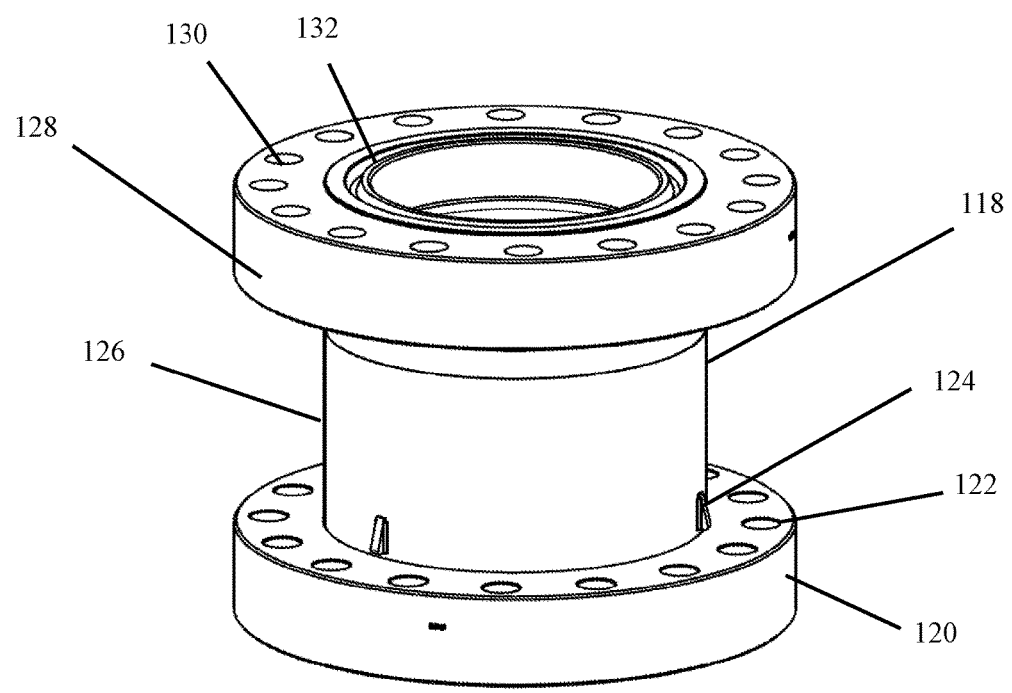
FIG. 8 is a perspective view of one embodiment thereof.

The swivel device 100 of one embodiment shown in FIG. 1 is implemented as a component of the bowl 101 as shown in FIG. 1 or as a separator device 118 as shown in FIG. 8. The swivel device 100, 118 enables adjustment of the bowl 101 to align the outlet 102 with the flowline.

The swivel device 100, 118 attaches to the stack (not pictured). The swivel device 100 of one embodiment is a component of the bowl. As a component of the bowl 101, the swivel device 100 eliminates the need for multiple attachments. Such an embodiment also reduces the amount of equipment required at the drilling operation.

In another embodiment, the swivel device 118 provides a neck 126 that raises the bowl (not picture) above the annular as shown in FIG. 8. Both swivel devices 100, 118 secure to the stack. A bottom shoulder, such as a flange secures to the stack. A neck is secured within the shoulder to allow the neck to rotate. Such rotation enables fine adjustment of the outlet 102 of the bowl 101. The user rotates the neck and the bowl to align the outlet 102 with the flowline.

FIG. 1 shows the embodiment of the swivel device 100 as a component of the bowl. Shoulder 104 secures neck 106 to the stack. Fasteners inserted into fastener apertures 108 secure the shoulder 104 to the stack. The shoulder 104 remains fixed in relation to the stack. Fasteners inserted into fastener apertures 108 limit movement of the shoulder 104.

Neck 106 rotates within shoulder 104. Neck 106 is an extension of the bowl. In one embodiment, the neck 106 is welded to the bowl 101. The shoulder 104 limits vertical movement of the neck 106 and bowl 101 while allowing the rotation of the bowl 101 to position the outlet 102.

Figure 2:
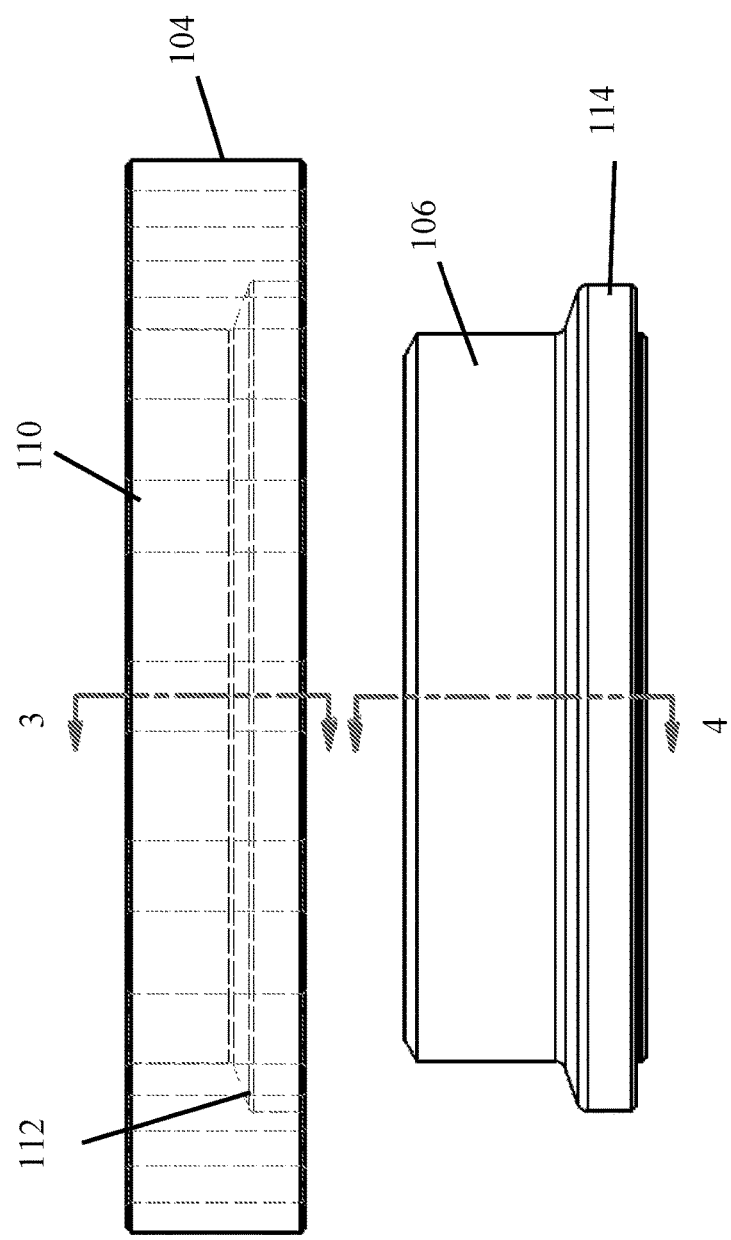
FIG. 2 is an exploded view thereof.

FIG. 2 shows the shoulder 104 removed from the neck 106. The shoulder provides an aperture 110 that increases in size towards the lowest most portion of the shoulder 104. In one embodiment, the diameter of opening 102 decreases from the bottom of the shoulder 104 vertically upward along the shoulder 104. Lip 112 contacts neck 106 to prevent the neck 106 from passing through the shoulder 104. Foot 114 extends outward from the outermost surface of the neck 106. The foot 114 increases the diameter of the neck 106. The foot 114 contacts lip 112 to prevent the foot passing through the shoulder 104.

Neck 106 secures to the bowl 101. The neck 106 provides foot 114 for securing the neck within the shoulder 104. The attachment of neck 106 to shoulder 104 via foot 114 allows the neck 106 to rotate within shoulder 104. While shoulder 104 is secured to the stack, the neck 106 can rotate within shoulder 104 for adjusting the outlet in relation to the flowline.

FIG. 3 shows the shoulder 104 with fastener apertures 108. Fastener apertures 108 pass through shoulder 104 for insertion of fasteners to secure the shoulder 104 to the stack. Lip 112 contacts foot 114 to prevent neck 106 from passing through shoulder 104. The diameter of the aperture 110 decreases at the lip 112 to limit vertical movement of the neck 106 upwards past lip 112.

FIG. 4 shows the neck 106 and opening 107. The diameter of opening 107 decreases at foot 114. Foot 114 provides the innermost surface and the outermost surface of neck 106. The outermost surface of foot 114 contacts lip 112 of shoulder 104.

The innermost surface of foot 114 enables placement of a seal at the contact surface between neck 106 and the stack. A seal is placed within seal groove 116. The seal contacts the stack to seal the drilling fluids.

Figure 5:
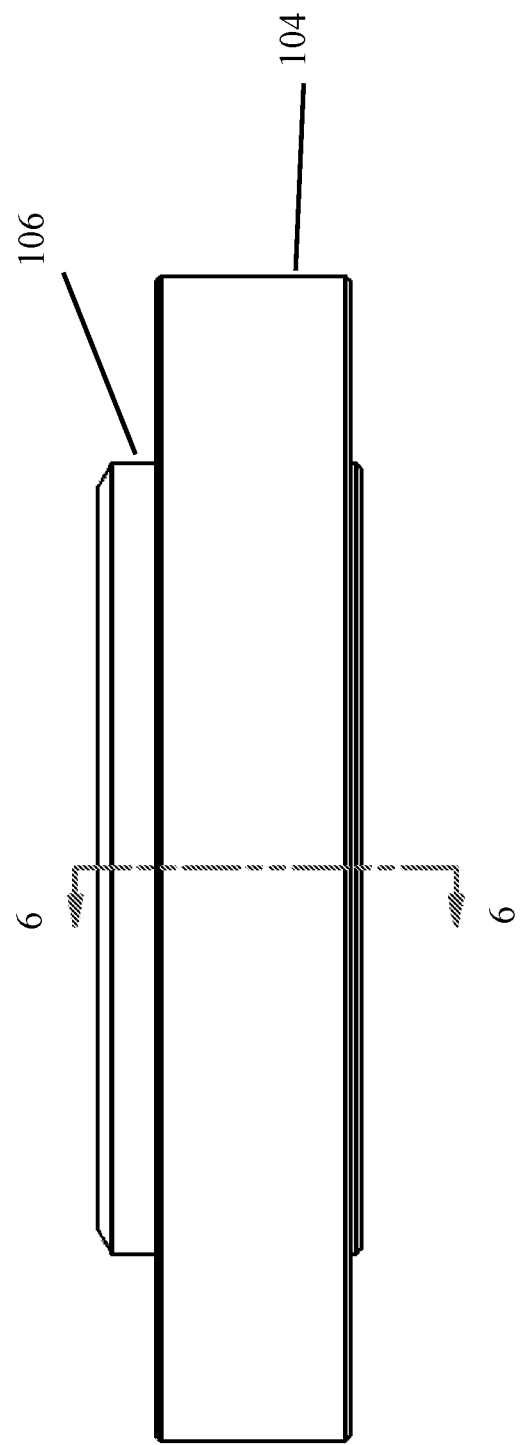
FIG. 5 is a partial front view thereof, the rear view being a mirror image of the front view.
Figure 6:
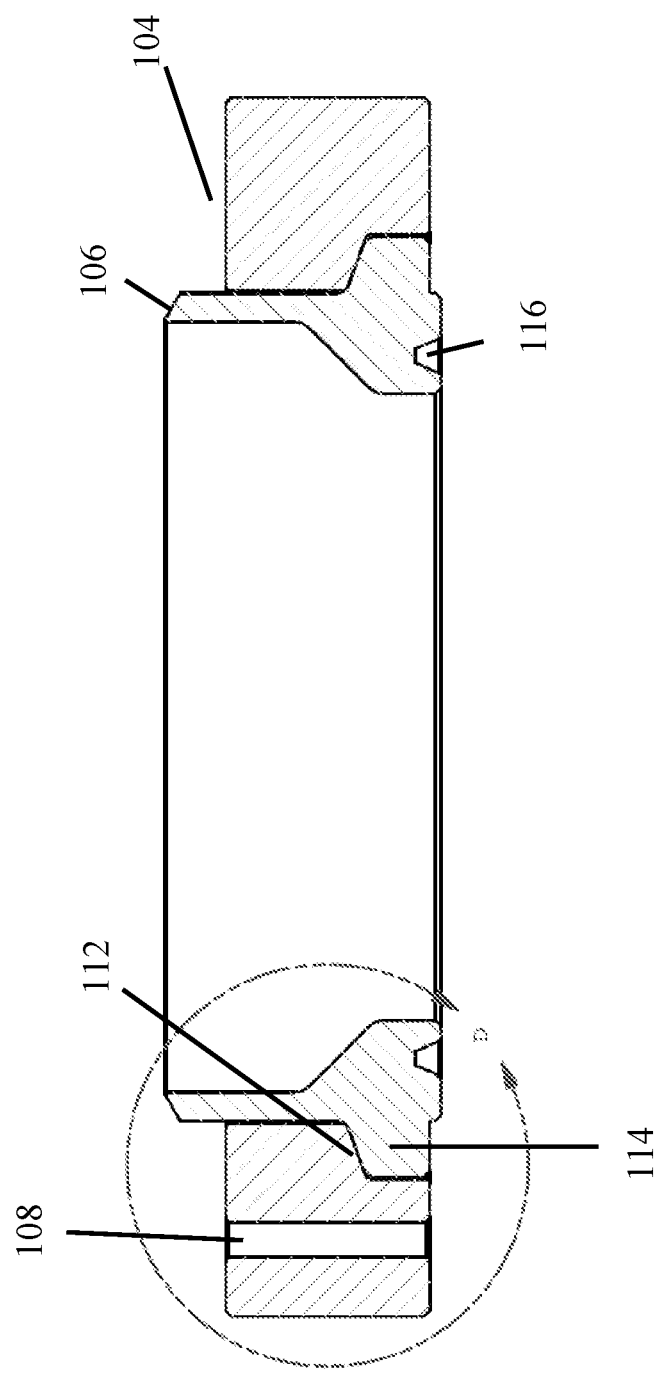
FIG. 6 is a partial sectional view thereof.
Figure 7:
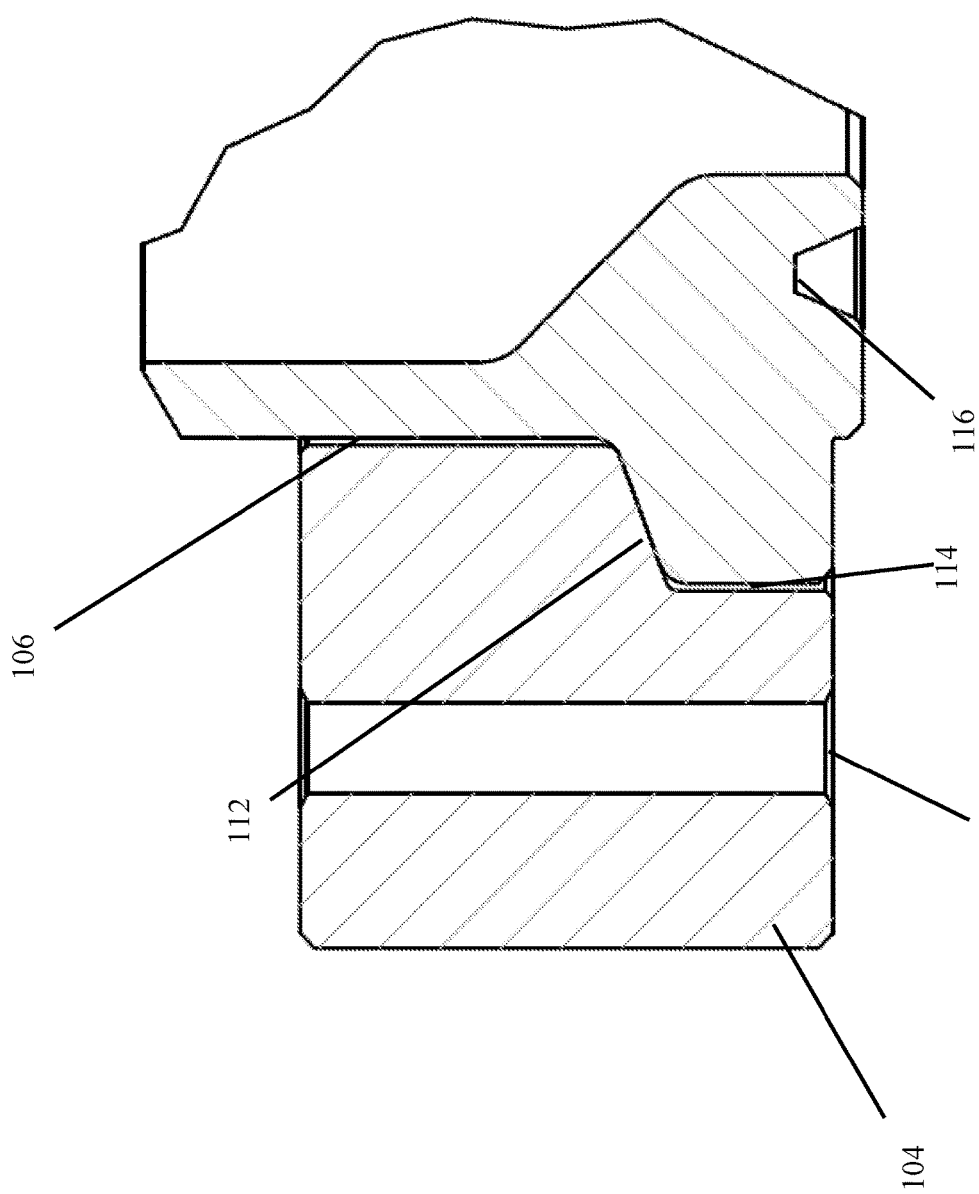
FIG. 7 is a sectional view thereof.

FIGS. 5-7 show the neck 106 inserted into shoulder 104. The fastener installed into the stack through fastener aperture 108 secures the shoulder 104 to the stack. The contact between lip 112 and foot 114 prevents the neck 106 from passing through the shoulder 104. The shoulder 104 remains fixed in relation to the stack due to the fasteners securing the shoulder 104 to the stack. Shoulder 104 secures the neck 106 to allow rotation of neck 106. Lip 112 limits the upward vertical movement of neck 106.

Seal groove 116 provides an area for placement of a seal. The seal creates a seal between the neck 106 and the stack.

Figure 9:
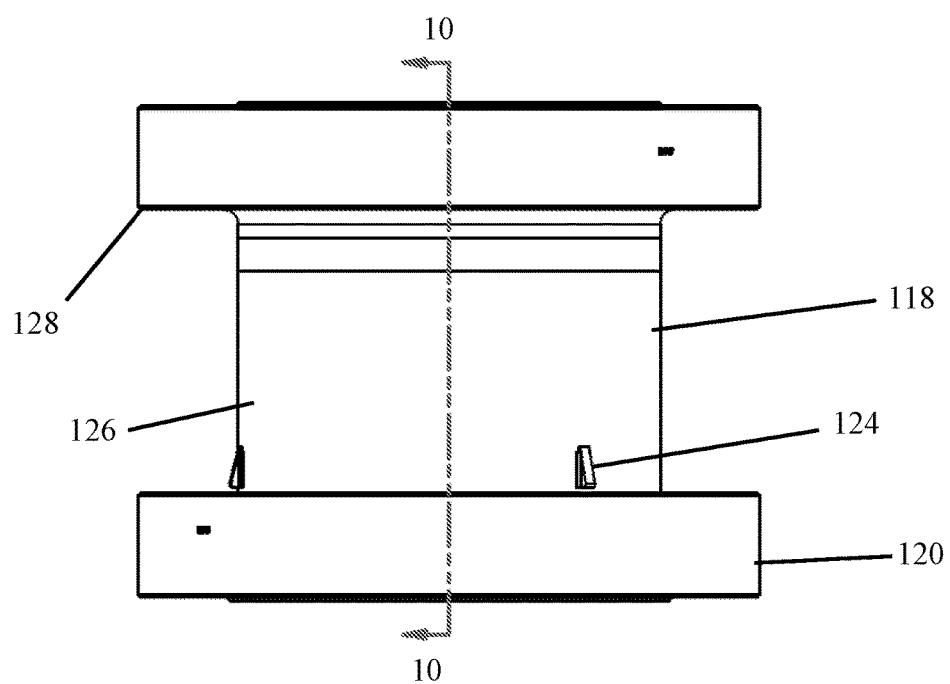
FIG. 9 is a side view thereof.

FIGS. 8 and 9 show another embodiment of the present invention of the swivel device 118. Swivel device 108 attaches to the bowl via fasteners inserted into fastener apertures 130. Neck 126 and head 128 rotate to enable rotation of the bowl and the outlet.

Shoulder 120 secures to the stack such that the shoulder 120 remains in a fixed position in relation to the stack. Similar to the embodiment discussed above, the fasteners insert into fastener apertures 122 downward into the stack.

The head 128 provides multiple fastener apertures 130 for securing the head 128 to the bowl. The bowl secures to the top of the head 128. Fasteners insert into the bowl and downward into apertures 130 of the head 128. Neck 126 and head 130 rotate with the bowl. The rotation of the head 126, head 130, and bowl adjusts the positioning of the outlet. The user rotates the neck 126, head 128, and bowl to align the outlet with the flowline.

The swivel device provides a flange, such as a shoulder that secures a neck within the shoulder. The neck rotates within the shoulder to allow for repositioning of the outlet of the bowl. In one embodiment, the swivel device provides a lower shoulder that allows rotation of the neck. An upper flange, such as head 128, secured to the neck remains fixed to the neck such that the upper flange rotates with the neck.

The bowl attaches to the upper flange located vertically above the shoulder. Such an embodiment with the upper flange raises the bowl off the annular.

Stopping fingers 124 protrude outwardly from the neck 126. The stopping fingers 124 prevent the shoulder 120 from travelling past the stopping fingers 126. Stopping fingers 124 are located above the shoulder 120 to allow rotation of the neck 126 and head 128. The stopping fingers 124 simplify the process of transporting and moving the swivel device 118. The stopping fingers 124 prevent the shoulder 120 from travelling up the neck 126 should the swivel device 118 be turned upside down.

Figure 10:
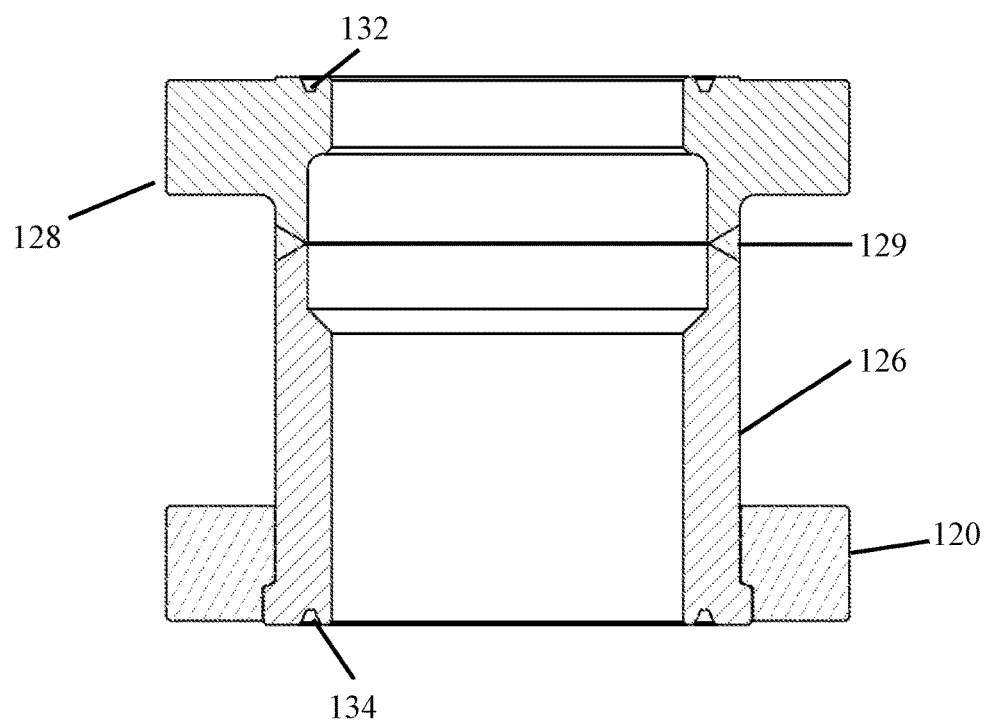
FIG. 10 is a sectional view thereof.
Figure 11:
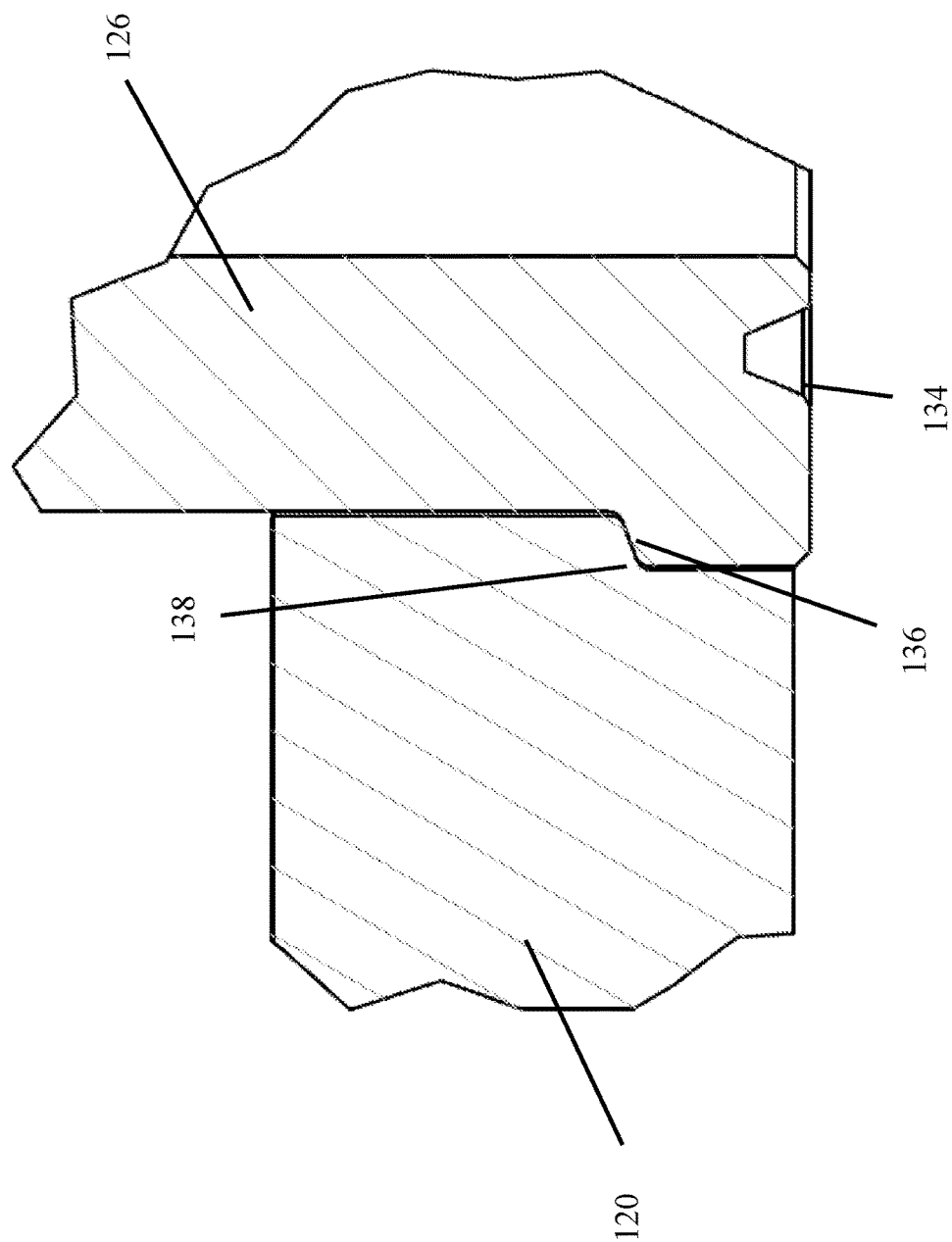
FIG. 11 is partial sectional view thereof.

FIGS. 10 and 11 show a sectional view of the swivel device and the attachment of head 128 with neck 126. The swivel device 118 provides an upper sealing groove 132 and a lower sealing groove 134. Seals insert into the sealing grooves 132, 134 to seal the swivel device 118. A seal placed within lower sealing groove 134 is placed adjacent the stack for sealing between the swivel device 118 and the stack. A seal is also placed within upper sealing groove 132. The seal placed within upper sealing groove 132 is located adjacent the bowl to seal between the swivel device 118 and the bowl.

The head 128 located above the neck 126 maintains pressure containment within the sealing device 118. In one embodiment, the head 128 is a separate piece that is welded onto the neck 126. The head 128 is welded onto the neck with a high pressure full pin weld 129. The weld 129 contains the pressure within the swivel device 118.

FIG. 11 shows the attachment of the shoulder 120 onto neck 126. The shoulder 120 fastens to the stack as discussed above via a fastener. The seal groove 134 provides an area for placement of a seal to seal between the neck 126 and the stack. The shoulder 120 secures the neck to the stack while allowing rotation of the neck 126. Lip 138 of the shoulder 120 extends inwardly to secure the neck 126. In one embodiment, the lip 138 extends radially inward.

Foot 136 of neck 126 extends outwardly, such as radially outward. The lip 138 located vertically above foot 136 limits vertical movement of the neck 126 while allowing rotation of neck 126.

The present invention provides a method for aligning the outlet of the bowl with the flowline. The user attaches a fixed shoulder to the stack. The shoulder limits the vertical movement of the neck. The interior surface of the shoulder narrows to a smaller diameter than the outer diameter of the neck. The narrower section of the shoulder prevents the neck from passing vertically passing through the shoulder. The shoulder limits vertical movement while allowing rotation of the neck. The user rotates the neck and the bowl to align the outlet with the flowline. After obtaining the proper orientation, the user attaches the outlet to the flowline.

The swivel device shown in FIGS. 8-11 can be configured to attach different sized bowls to the stack. The swivel device 118 can be configured to secure a bowl sized for a 13-5/8-5M to a stack configured to receive a bowl for 11-5M and vice versa. Such a swivel device allows rotation of the bowl. The swivel device also allows different sized bowls to attach to different sized stacks. Such a swivel device increases the functionality of different sized bowls.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A device for securing a bowl to a stack for rotating the bowl to align an outlet of the bowl with a flowline of a drilling rig, the device comprising:
    a shoulder that attaches to the stack;
    a central opening of the shoulder defining a vertical axis wherein the opening narrows vertically above a lower portion of the shoulder;
    a neck sized to be inserted into the central opening wherein an outer surface of the neck narrows vertically above a lower portion of the neck wherein the shoulder limits the vertical movement of the neck when the neck is placed within the central opening of the shoulder, wherein the neck rotates in relation to the shoulder;
    a head extending horizontally above the neck wherein an outer surface of the head extends outward from an outer surface of the neck, the bowl securing to the head; and
    a seal groove located on a top surface of the head configured to receive a seal for placement of the seal between the head and the bowl.

2. The device of claim 1 wherein the bowl is located vertically above the head when the bowl is secured to the head.

3. The device of claim 2 wherein the head is welded to the neck.

4. The device of claim 3 wherein the head is welded by a high pressure full pin weld.

5. A device for securing a bowl to a stack for rotating the bowl to align an outlet of the bowl with a flowline of a drilling rig, the device comprising:
    a shoulder that attaches to the stack;
    a central opening of the shoulder defining a vertical axis extending vertically through the shoulder;
    a lip of the shoulder located on an interior surface of the shoulder adjacent the central opening wherein the lip extends inward towards the opening;
    a neck sized to insert into the central opening wherein the lip prevents the neck from passing vertically through the central opening wherein the lip limits the vertical movement of the neck within the central opening of the shoulder, wherein the neck rotates in relation to the shoulder;
    a foot of the neck located on a lower portion of the neck wherein the foot extends outwardly towards the shoulder wherein the lip contacts the foot to limit movement of the neck vertically through the central opening;
    a head extending horizontally above the neck wherein an outer surface of the head extends outward from an outer surface of the neck, the bowl securing to the head; and
    a seal groove located on a top surface of the head configured to receive a seal for placement of the seal between the head and the bowl.

6. The device of claim 5 wherein the bowl is located vertically above the head when the bowl is secured to the head.

7. The device of claim 6 wherein the head is welded to the neck.

8. A device for securing a bowl to a stack for rotating the bowl to align an outlet of the bowl with a flowline of a drilling rig, the device comprising:
    a shoulder that attaches to the stack;

a central opening of the shoulder defining a vertical axis extending vertically through the shoulder;

a lip of the shoulder located on an interior surface of the shoulder adjacent the central opening wherein the lip extends radially inwards towards the opening to decrease the diameter of the central opening at the lip;

a neck sized to insert into the central opening wherein the lip prevents the neck from passing vertically through the central opening wherein the lip limits the vertical movement of the neck within the central opening of the shoulder, wherein the neck rotates in relation to the shoulder;

a neck opening extending vertically through the neck;

a foot of the neck located on a lower portion of the neck wherein the foot extends radially outward towards the shoulder wherein the lip contacts the foot to limit movement of the neck vertically through the central opening; and a seal groove located on a top surface of the neck configured to receive a seal for placement of the seal between the neck and the bowl.

* * * * *